(12) United States Patent
Watanabe

(10) Patent No.: US 6,700,126 B2
(45) Date of Patent: Mar. 2, 2004

(54) RADIOGRAPHIC APPARATUS

(75) Inventor: Tetsuo Watanabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 09/874,247

(22) Filed: Jun. 6, 2001

(65) Prior Publication Data
US 2002/0005490 A1 Jan. 17, 2002

(30) Foreign Application Priority Data
Jun. 9, 2000 (JP) ........................................ 2000-173638

(51) Int. Cl.⁷ ................................................. G01T 1/24
(52) U.S. Cl. ................................................. 250/370.09
(58) Field of Search .................................... 250/370.09

(56) References Cited

U.S. PATENT DOCUMENTS

| | | | |
|---|---|---|---|
| 3,496,360 A | 2/1970 | Dewan | |
| 4,258,264 A | 3/1981 | Kotera et al. | |
| 4,681,227 A | * 7/1987 | Tamura et al. | ............... 206/455 |
| 4,922,105 A | * 5/1990 | Hosoi | ...................... 250/484.4 |
| 5,511,106 A | * 4/1996 | Doebert et al. | ............. 378/146 |
| 5,579,366 A | 11/1996 | Doebert et al. | ............. 378/189 |
| 5,796,109 A | 8/1998 | Frederick et al. | ........... 250/368 |

FOREIGN PATENT DOCUMENTS

| | | |
|---|---|---|
| DE | 33 15 609 | 10/1984 |
| EP | 0 933 650 | 8/1999 |
| JP | 55-12429 | 1/1980 |
| JP | 56-11395 | 2/1981 |

* cited by examiner

*Primary Examiner*—Constantine Hannaher
(74) *Attorney, Agent, or Firm*—Fitzpatrick, Cella, Harper & Scinto

(57) ABSTRACT

In a radiographic apparatus or a digital cassette in which a metal support is fitted to the interior of a casing of the apparatus through spacers, an x-ray image detection panel is disposed on a front surface of the support, an electric circuit board is fixed to a back surface of the support through projections, and the x-ray image detection panel and the electric circuit board are connected to each other by flexible circuit boards. Because shock absorbers made of sheet-like elastic material or gel material are disposed on the inner side of the side walls of the casing, even if the apparatus is dropped on its side wall by mistake and the side wall of the casing is instantaneously deformed, the shock is absorbed by the shock absorber, and as a result the shock transmitted to the support, the x-ray image detection panel, the flexible circuit board or the like can be reduced, and the shock resistance of the apparatus is improved.

18 Claims, 10 Drawing Sheets

RADIOGRAPHIC APPARATUS

BACKGROUND OF THE INVENTION

1. Field of the Invention

The present invention relates to an radiographic apparatus, and more particularly to a portable radiographic apparatus or a radiographic apparatus of a cassette type.

2. Related Background Art

Up to now, an apparatus or a system that irradiates an object with radiation and detects the intensity distribution of the radiation transmitted through the object to obtain a radiation image of the object has been generally widely utilized in the field of industrial non-destructive inspection and medical diagnosis. As a general method such radiography, there is a film/screen method with respect to x-rays. This is a radiographic method that combines a photographic film with a phosphor having a sensitivity with respect to the x-rays. In that method, a sheet-like phosphor made of a rare earth material that emits light upon receiving the x-rays is held in close contact with both surfaces of the photosensitive film, the x-rays transmitted through the object are received by the phosphor and converted into visible light, the visible light is caught by the photosensitive film, and a latent image formed on the film is developed through chemical treatment, whereby an x-ray image (intensity distribution of radiation) can be visualized.

On the other hand, with the progress of the digital technology in recent years, there has been demanded a system in which the radiation image is converted into an electric signal, and after the electric signal is subjected to image processing, the electric signal is reproduced as a visible image on a CRT or the like, thereby to obtain high-quality radiation image information. As a method of converting the radiation image into the electric signal, there has been proposed in Japanese Patent Application Laid-Open No. 55-12429, Japanese Patent Application Laid-Open No. 56-11395, etc., a radiation image recording/reproducing system in which an image of radiation transmitted through an object is stored in a photostimulable phosphor sheet as a latent image once, and thereafter an excitation light such as a laser beam is irradiated onto the phosphor to read the latent image photoelectrically, thereby outputting the radiation image information as a visible image on the basis of the read electric signal. This method is called "computed radiography".

Also, with the progress in the semiconductor process technology in recent years, there has been developed a device for radiographing the radiation image likewise using a semiconductor sensor. Because the system of this type has a very wide dynamic range as compared with a conventional radiographic system using photosensitive film, the system is relatively insensitive to variations in the amount of exposure of radiation, resulting in the advantage that an appropriate radiation image is likely to be obtained. In addition, there is another advantage in that no chemical developing process is required, allowing the instant obtaining of an output image.

FIG. 1 shows a conceptual diagram of a system using a radiographic apparatus, and an x-ray image taking apparatus (a radiographic apparatus) 1 includes an x-ray image detecting sensor 2 therein, and x-rays irradiated from an x-ray generating device 3 and transmitted through an object S are detected by the x-ray image sensor 2 made up of a plurality of photoelectric conversion elements which are arranged in a two-dimensional grating-like fashion. An image processing means 4 subjects an image signal outputted from the x-ray image sensor 2 to digital image processing, and a monitor 5 displays the image signal which has been subjected to the digital image processing as an x-ray image of the object S.

Up to now, radiographic apparatus of that type are located in a radiation room for use, but there has been recently demanded a so-called "electronic cassette" or "digital cassette", which is a radiographic apparatus which is thin, light in weight and portable, because such a cassette permits faseter radiography and of more various body parts.

FIG. 2 is a vertical cross-sectional view of a conventional electronic cassette, in which a casing 11 is fitted with a support 13 through a spacer 12. On the support 13 is disposed an x-ray image detection panel 14 in which a phosphor 14a that converts irradiated x-rays into visible light, a plurality of photoelectric conversion elements 14b arranged in a grating-like fashion which convert the converted visible light into an electric signal, and a substrate 14c that supports the photoelectric conversion elements 14b are laminated one on another. Also, the photoelectric conversion elements 14b are connected to a circuit board 16 disposed on a lower surface of the support 13, on which electronic parts that process an electric signal are mounted, through a flexible circuit board 15 on which are mounted electronic parts that process an electric signal that has been generated by photoelectric conversion.

Radiography using an electronic cassette is different from that using a fixed type radiographic apparatus, for its arrangement with respect to a patient changes depending on the body part to be radiographed. That is, it is desirable that the cassette may be used in such a manner that the patient gets directly on the cassette or holds the cassette in his or her arms. For example, in the case of radiographing extremities of a patient, the cassette is disposed horizontally, the patient lies or stands on the upper surface of the cassette, and the x-rays are irradiated onto the patient from the opposite side. Therefore, unlike the fixed type apparatus, the electronic cassette must be designed with a strength that withstands a load applied by the subject during radiographing.

Also, the operator must handle and manipulate the cassette, and drop the cassette or make the cassette collide with something by mistake. In view of the possibility of such accidents, the structural elements of the cassette (at least an x-ray image sensor inside the cassette) must be protected so that normal functioning is maintained.

Therefore, it is required that the electronic cassette is designed taking strength, vibration resistance, and shock resistance into consideration. For that reason, it is required that a casing that contains the x-ray image detection panel and a support that supports the x-ray image detection panel particularly rigid in structure. This structure prevents the cassette from being small in size or light in weight.

In order to solve the above problem, three has been proposed a structure in which the casing 11 and the spacer 12 are fixed to each other through an elastic body 21 as shown in FIG. 3. However, while that structure exhibits resistance against loads, shocks, vibrations, and the like in the direction in which the x-rays are incident, that is, in a thickness direction of the cassette, it entails a disadvantage due to deformation of the elastic body 21 in a direction substantially orthogonal to the direction of incidence of the x-rays (a direction substantially parallel to the detection plane of the x-ray image detection panel), that is, in a lateral direction of the cassette. Then, for example, in the case where the cassette falls down on the lateral side of the cassette, there is a fear that the flexible circuit board 15 extending around the side of the support 13 may be sandwiched between the support 13 and the casing 11 and be damaged.

SUMMARY OF THE INVENTION

The present invention has been made to eliminate or reduce the above-described problems, and therefore an object of the present invention is to provide a thin, light, and portable radiographic apparatus which is capable of reducing shocks to the structural elements of a cassette in a lateral direction, that is, in a direction substantially parallel to the detection surface of the x-ray image detection panel.

According to one aspect of the present invention, there is provided a radiographic apparatus including a radiation detector having a detection plane detecting the radiation image;

a support supporting on a front surface thereof the radiation detector;

a casing housing the radiation detector and the support; and a shock absorber placed at least any one of on a side wall of the casing, on a side wall of the support, in a side wall of the casing or between the side wall of the casing and the side wall of the support.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Now, a description will be given in more detail of the preferred embodiments of the present invention with reference to FIGS. 4 to 14.

Figure 1:
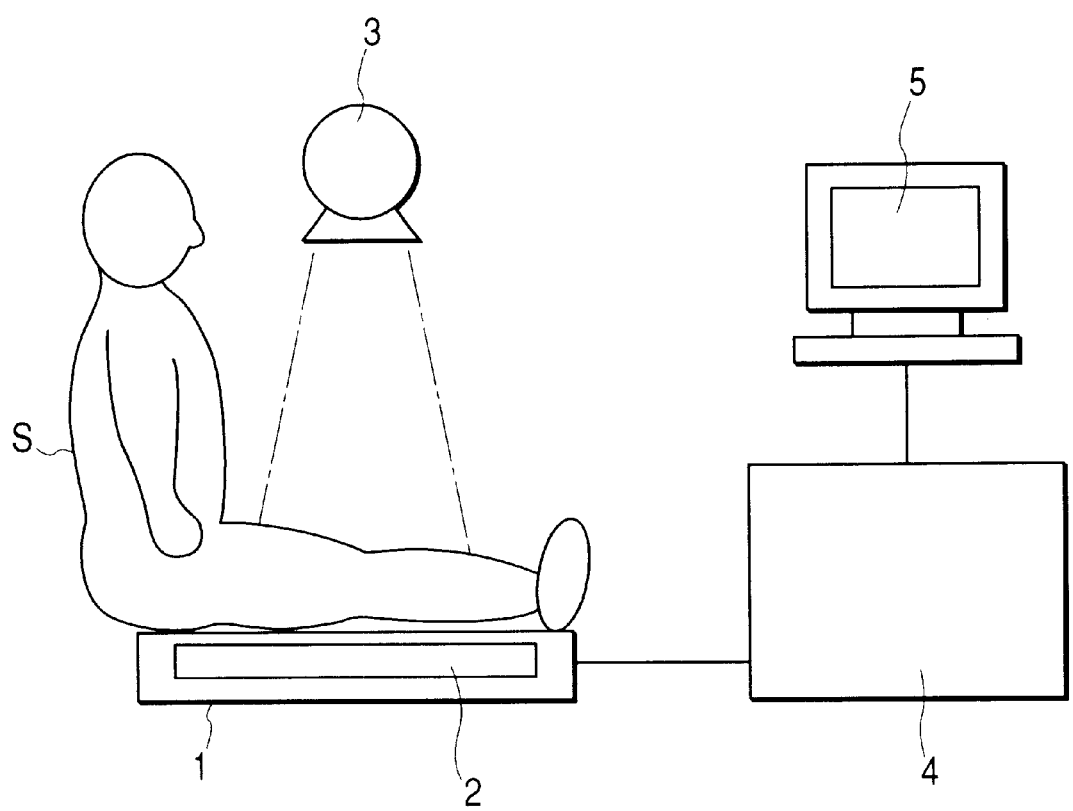
FIG. 1 is a conceptual drawing of a system.
Figure 2:
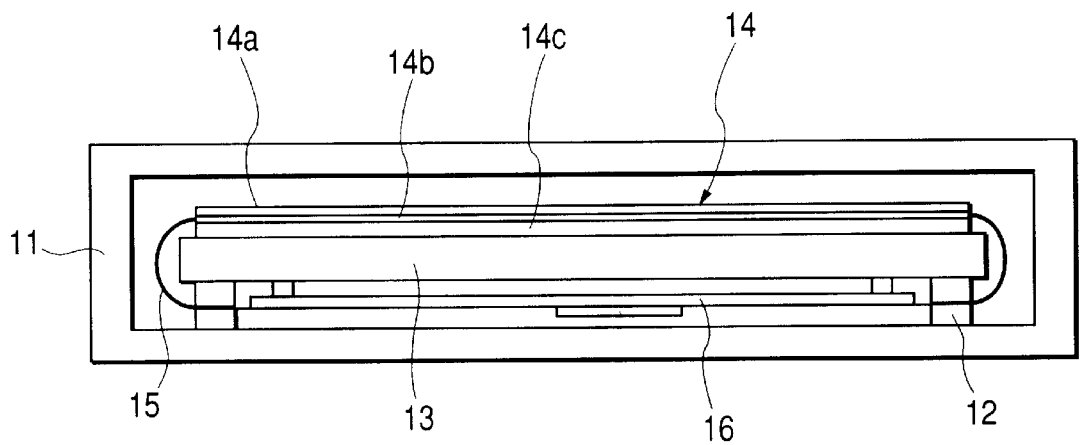
FIG. 2 is a vertical cross-sectional view of a conventional example.
Figure 3:
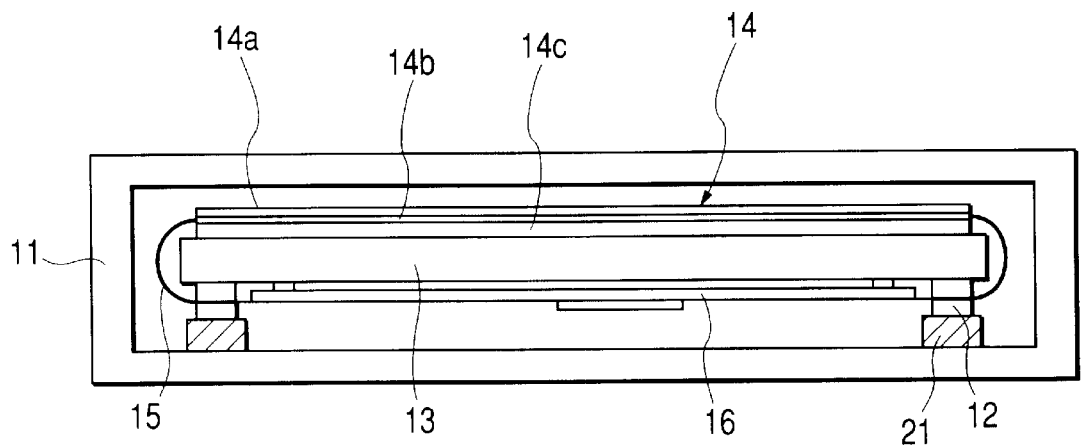
FIG. 3 is a vertical cross-sectional view of a conventional example.
Figure 4:
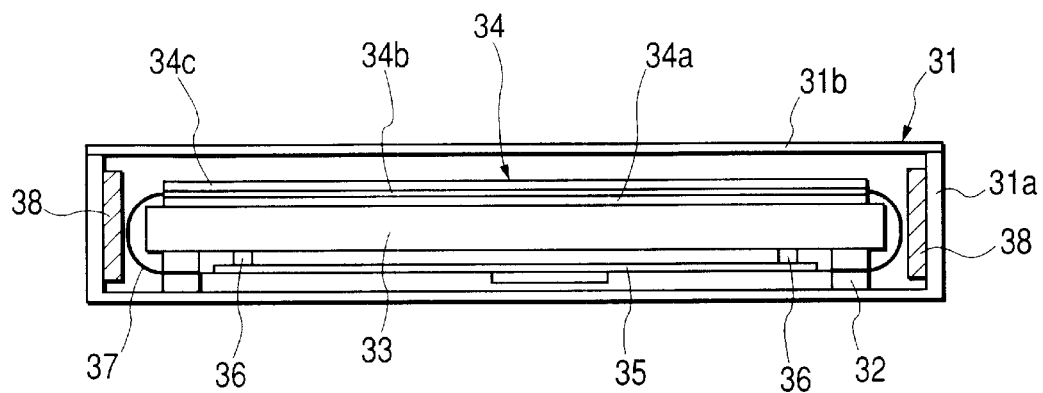
FIG. 4 is a vertical cross-sectional view of a first embodiment.
Figure 5:
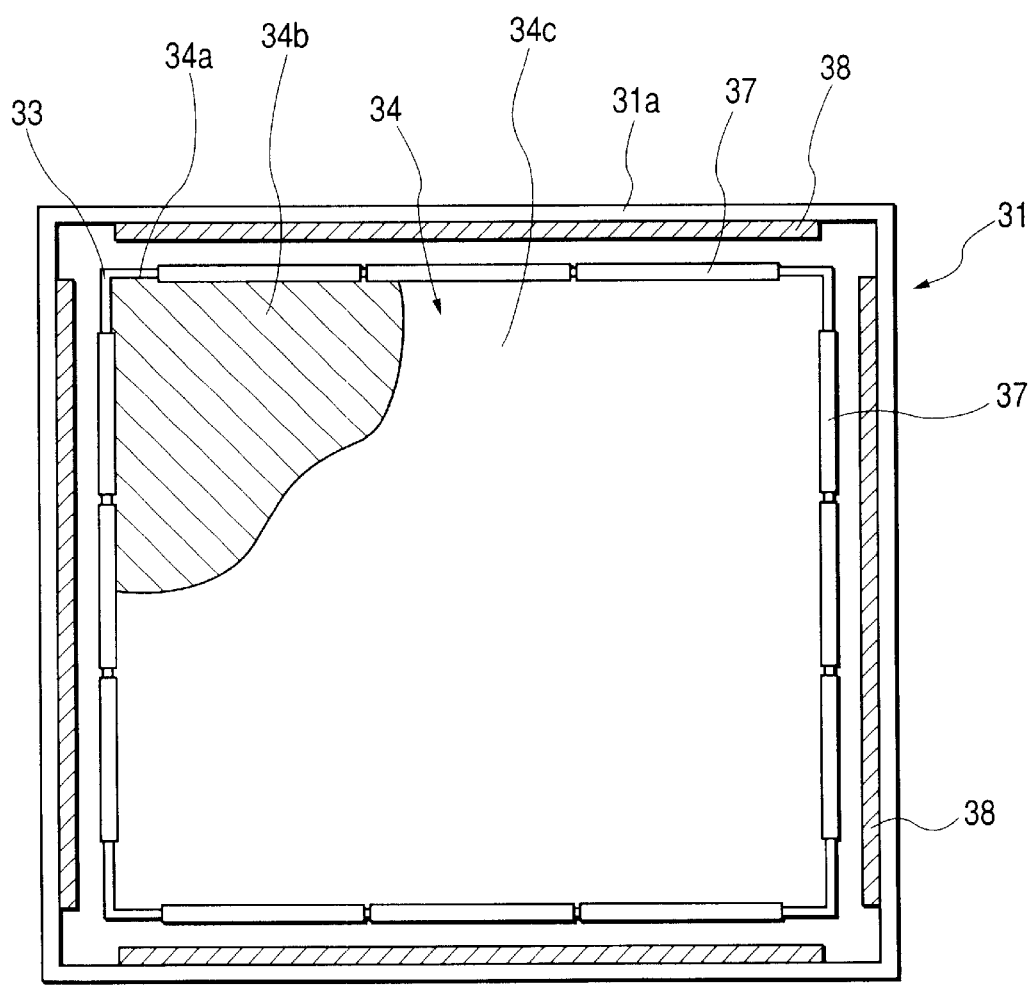
FIG. 5 is a lateral cross-sectional view of a first embodiment.

FIG. 4 is a vertical cross-sectional view of an x-ray image taking apparatus (a radiographic apparatus) in accordance with a first embodiment, and FIG. 5 is a lateral cross-sectional view of the apparatus. A main body 31a of a casing 31 is hermitically sealed with a lid 31b having a sufficient x-ray transmittance, and a support 33 made of metal is fitted to the interior of the casing main body 31a through a spacer 32. Also, on the support 33 is disposed (fixed) an x-ray image detection panel (hereinafter also referred to as an "x-ray panel") 34 which is structured by integrally laminating a board 34a formed of a glass plate that does not chemically react with a semiconductor device, withstands the temperatures involved in semiconductor processing, and has dimensional stability, a plurality of photoelectric conversion elements 34b that is so formed as to be arranged two-dimensionally through the semiconductor processing, and a phosphor sheet 34c formed by coating a phosphor made of metal compound on a resin plate.

Then, a circuit board 35, on which electronic parts for processing an electric signal obtained through photoelectric conversion by the x-ray panel 34 are mounted, is fixed by means of projections 36 to a lower surface of the support 33. The circuit board 35 and the photoelectric conversion elements 34b are connected to each other by flexible circuit boards 37. A plurality of these flexible circuit boards 37, on which signal lines and control lines for reading the electric signal from the photoelectric conversion elements 34b are wired, are disposed around the outer periphery of the substrate 34a. Each of the flexible circuit boards 37 extends to the circuit board 35 disposed on a back surface (the lower surface) of the support 33 through a side of the support 33. Some circuit elements, for example, an amplifier that amplifies the electric signal from the x-ray panel 34, etc., may be mounted on the flexible circuit boards 37.

Also, shock absorbers 38 made of elastic sheet-like rubber or gel material are fitted to the inner sides of side walls of the casing main body 31a so as to cover sides of the flexible circuit board 37, and a slight gap is defined between each of the shock absorbers 38 and the support 33, and the flexible circuit boards 37 are drawn through those gaps.

Since the shock absorbers 38 are thus inserted or arranged on the inner sides of the main body 31a, even if the cassette drops by mistake and the casing 31 is instantaneously deformed, the shock is absorbed by the shock absorbers 38, and the shock directly transmitted to the support 33 is reduced.

The shock absorbers 38 are so arranged as to form gaps with the flexible circuit boards 37 so that the shock absorbers 38 are normally prevented from being in contact with the flexible circuit boards 37, and only when the casing 31 is deformed due to the above-described shock or the like, do the shock absorbers 38 act as shock absorbers.

This is to prevent unnecessary forces being exerted on the flexible circuit boards 37 which may occur in a case where the shock absorbers 38 and the flexible circuit boards 37 are always in contact with each other. For example, there is a case in which, when necessary elements including a detection unit (x-ray panel 34) are mounted in the interior of the casing 31 and the shock absorbers 38 and the flexible circuit boards 37 are brought into contact with each other in assembling, a force is applied to the flexible circuit boards 37 by mistake, thereby damaging the flexible circuit board 37. Also, assuming that the casing 31 vibrates during conveyance, the vibrations are transmitted to the flexible circuit boards 37 through the shock absorbers 38 that are in contact with the flexible circuit boards 37, as a result of which the connection portions of the flexible circuit boards 37 may be adversely affected.

Accordingly, in order to prevent the above-described drawbacks or problems, it is desirable to make the mentioned gaps as small as possible so that the apparatus does not become unnecessarily large.

Also, similarly, even in a case where the casing 31 is deformed beyond its elastic limit, the main portion of the interior of the casing can be protected by the shock absorbers 38, and this structure makes it unlikely that the x-ray image taking function will be impaired. Also, even if the flexible circuit boards 37 are sandwiched between the peripheral parts (for example, in a case where a force is exerted on the flexible circuit boards 37), it is unlikely that the flexible circuit boards 37 will be damaged, due to the elasticity of the sock absorbers 38.

Figure 6:
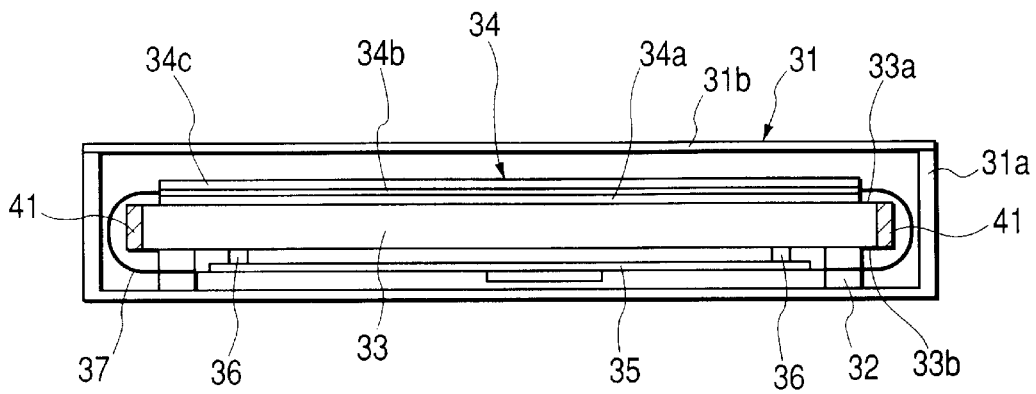
FIG. 6 is a vertical cross-sectional view of a second embodiment.

FIG. 6 shows a cross-sectional view of the x-ray image taking apparatus in accordance with a second embodiment, in which the same members as those in the first embodiment are denoted by like reference characters. The x-ray image detection panel 34 is fitted to the support 33 as in the first embodiment. The x-ray image detection panel 34, the circuit board 35, the flexible circuit boards 37 and the like constitute an x-ray image detector which is built in the casing 31.

Shock absorbers 41 are made of elastic sheet-like rubber or gel material as in the first embodiment, but differ from those in the first embodiment in that the shock absorbers 41 are fitted to the outer peripheral portion of the support 33. The flexible circuit boards 37 extend so as to cover the shock absorbers 41, with a slight gap between the flexible circuit boards 37 and the shock absorbers 41.

With arrangement of the shock absorbers 41 on the side of the support 33, the flexible circuit boards 37 can be prevented from being in direct contact with edge portions 33a and 33b of the support 33, etc., and thereby safety with respect to the flexible circuit boards 37 is improved.

Figure 7:
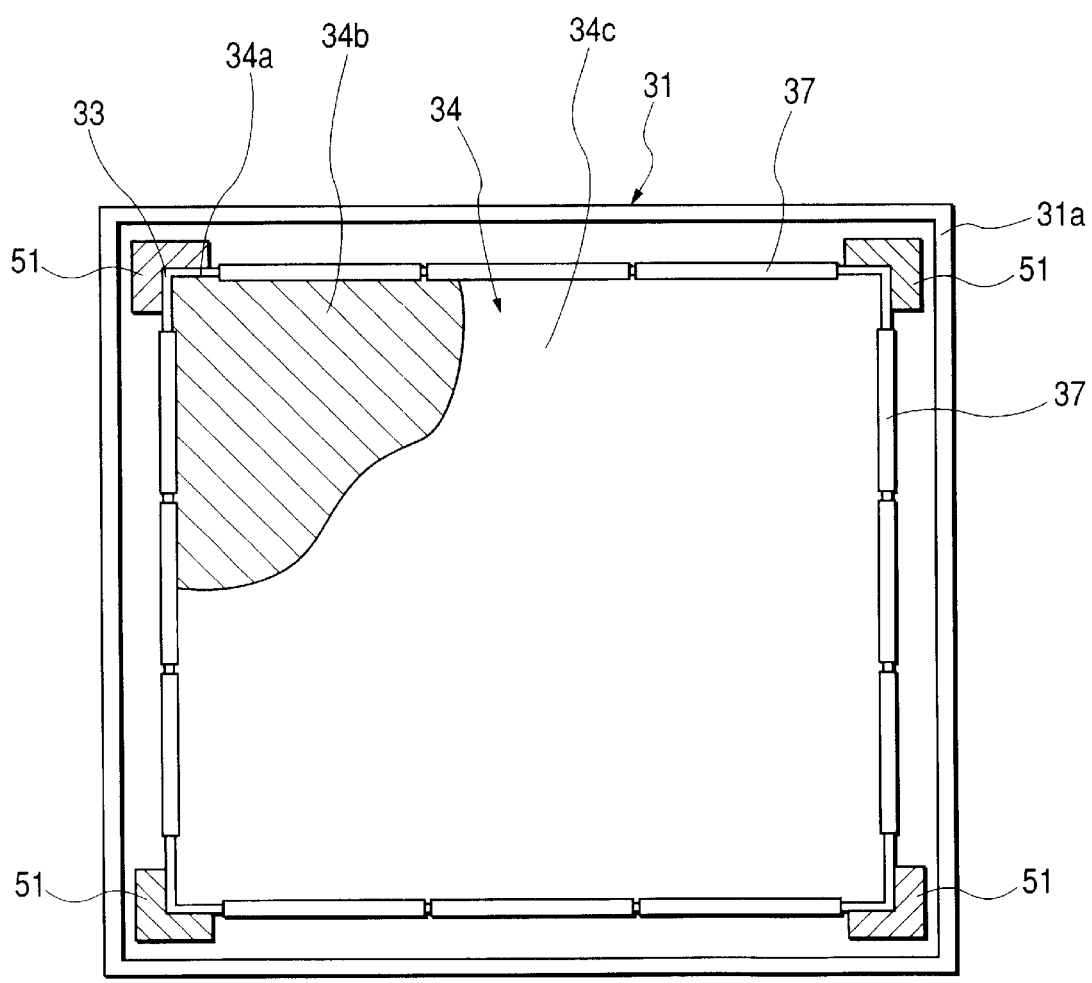
FIG. 7 is a lateral cross-sectional view of a third embodiment.

FIG. 7 is a lateral cross-sectional view of an x-ray image taking apparatus in accordance with a third embodiment. In the x-ray image taking apparatus of this embodiment, the support 33 is fixed to the casing 31 through spacers (not shown) as in the first embodiment. Also, the x-ray panel 34, a circuit board (not shown), the flexible circuit boards 37 and the like constitute an x-ray image detector. In this embodiment, shock absorbers 51 made of a substantially L-shaped plastic or rubber (elastic member) relatively high in hardness or the like are disposed at the inner sides of four corners of the side walls of the casing 31 as shock absorber blocks. The shock absorber may be placed at least any one of on an inner corner of the casing, on a corner of the support, or between the corner of the casing and the corner of the support.

With such insertion or construction of the shock absorbers 51, unlike the first and second embodiments, a great effect is exhibited with respect to a shock such as occurs when the x-ray image taking apparatus is dropped onto the corner portion thereof, for the deformation of the casing 31 can be suppressed by the support 33 and the shock absorbers 51. Because the support 33 is relatively strong with respect to the lateral direction (the direction parallel to the surface of the support 33 that supports the x-ray panel 34) as compared with the direction perpendicular to the surface of the support 33 that supports the x-ray panel 34, the above-described effect can be exhibited while the shock from the casing 31 is absorbed by the deformation of the shock absorbers 51 to some degree. Also, the shock absorbing action is effected by the shock absorbers 51 with respect to a shock from the lateral direction, for example, in a case where the cassette is dropped onto the side surface thereof. Therefore, the resistance is also improved with respect to damage to the x-ray image taking apparatus due to shocks caused by dropping onto the lateral surface of the cassette as in the first and second embodiments.

Also, since the shock absorbers are disposed at portions (for example, four corners) at the inner sides of the side walls of the casing 31 where there are no flexible circuit boards 37, unlike the first and second embodiments, it is unnecessary to take a need for gaps between shock absorbers and flexible circuit boards 37 into consideration, and as a result, downsizing the casing 31 is still more feasible, as compared with the first and second embodiments.

Figure 8:
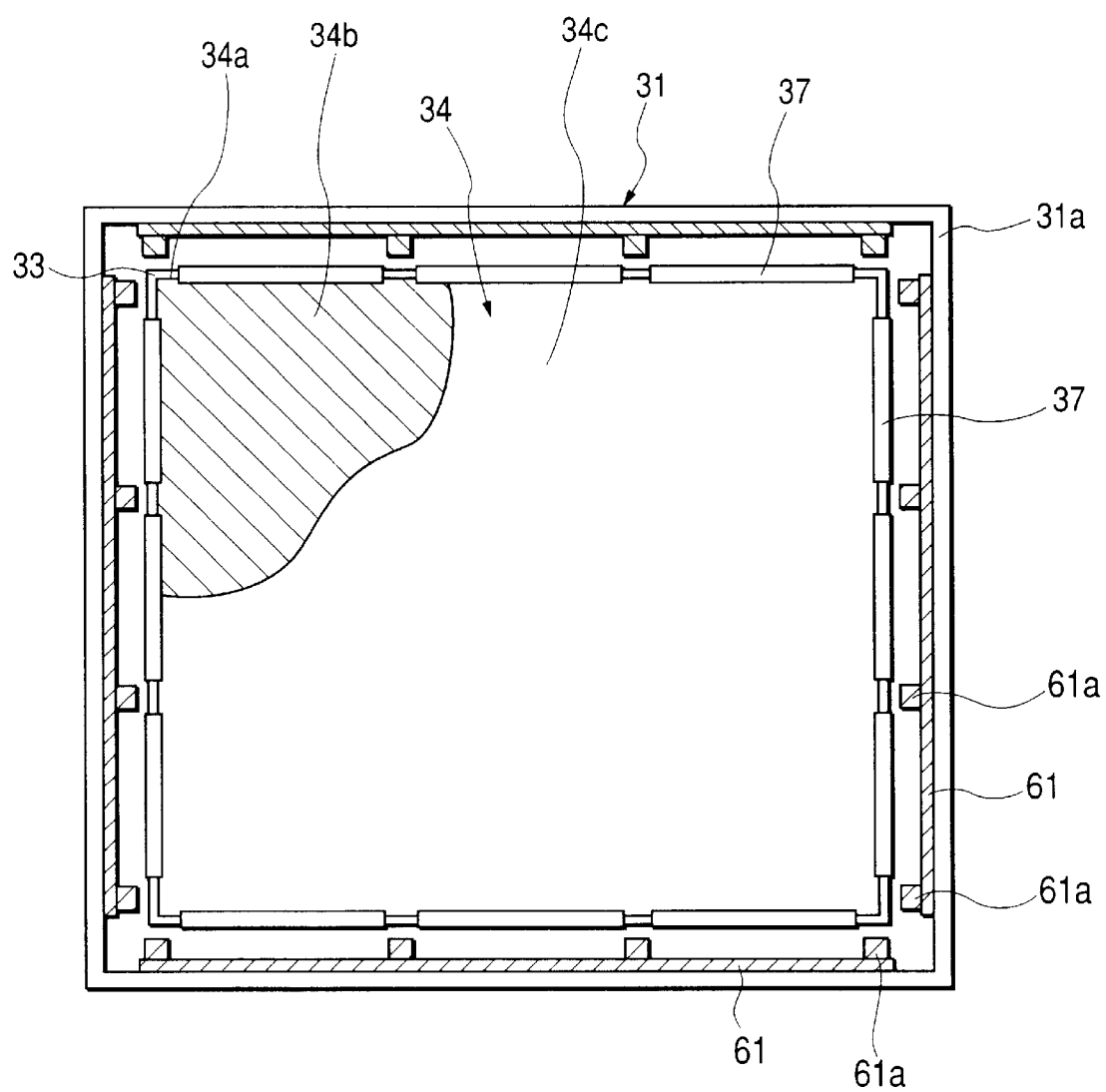
FIG. 8 is a lateral cross-sectional view of a fourth embodiment.

FIG. 8 shows a lateral cross-sectional view of an x-ray image taking apparatus in accordance with a fourth embodiment. The flexible circuit boards 37 are so disposed as to expand the gaps between the respective adjacent flexible circuit boards 37, and shock absorbers 61 made of plastic or rubber (elastic member) and the like relatively high in hardness having projections 61a corresponding to the respective gaps between the flexible circuit boards 37 are fitted to the inner walls (inner sides of the side walls) of the casing 31.

In the first and second embodiments, the shock absorbers 38 or the shock absorbers 41 are brought into direct contact with the flexible circuit boards 37 to protect the flexible circuit boards 37 when the casing 31 is deformed as the result of being dropped or the like. Also, in the third embodiment, the shock absorbers 51 serve as stoppers that suppress the deformation of the casing 31, and also the shock absorbers 51 are disposed at the four corners for the purpose of more-effectively withstanding shocks from the oblique direction due to being dropped on one of the corners. As compared with the above embodiments, the shock absorbers 61 in the fourth embodiment function as stoppers having projections which are arranged between the respective flexible circuit boards 37.

In other words, when the side walls of the casing 31 are deformed, the projections 61a of the shock absorbers 61 are abutted against the lateral planes of the support 33, further suppressing deformation of the side walls of the casing 31. In this case, since the amount of deformation of the side walls of the casing 31 within the intervals of the respective projections 61a is small, it is possible to prevent or suppress the flexible circuit boards 37 being sandwiched between the side walls of the casing 31 and the support 33 and being damaged as a result. Further, because the amount of deformation of a center portion of each the side walls of the casing 31 can be also suppressed, the safety of the x-ray image taking apparatus against shocks from the lateral direction is still further improved.

Figure 9:
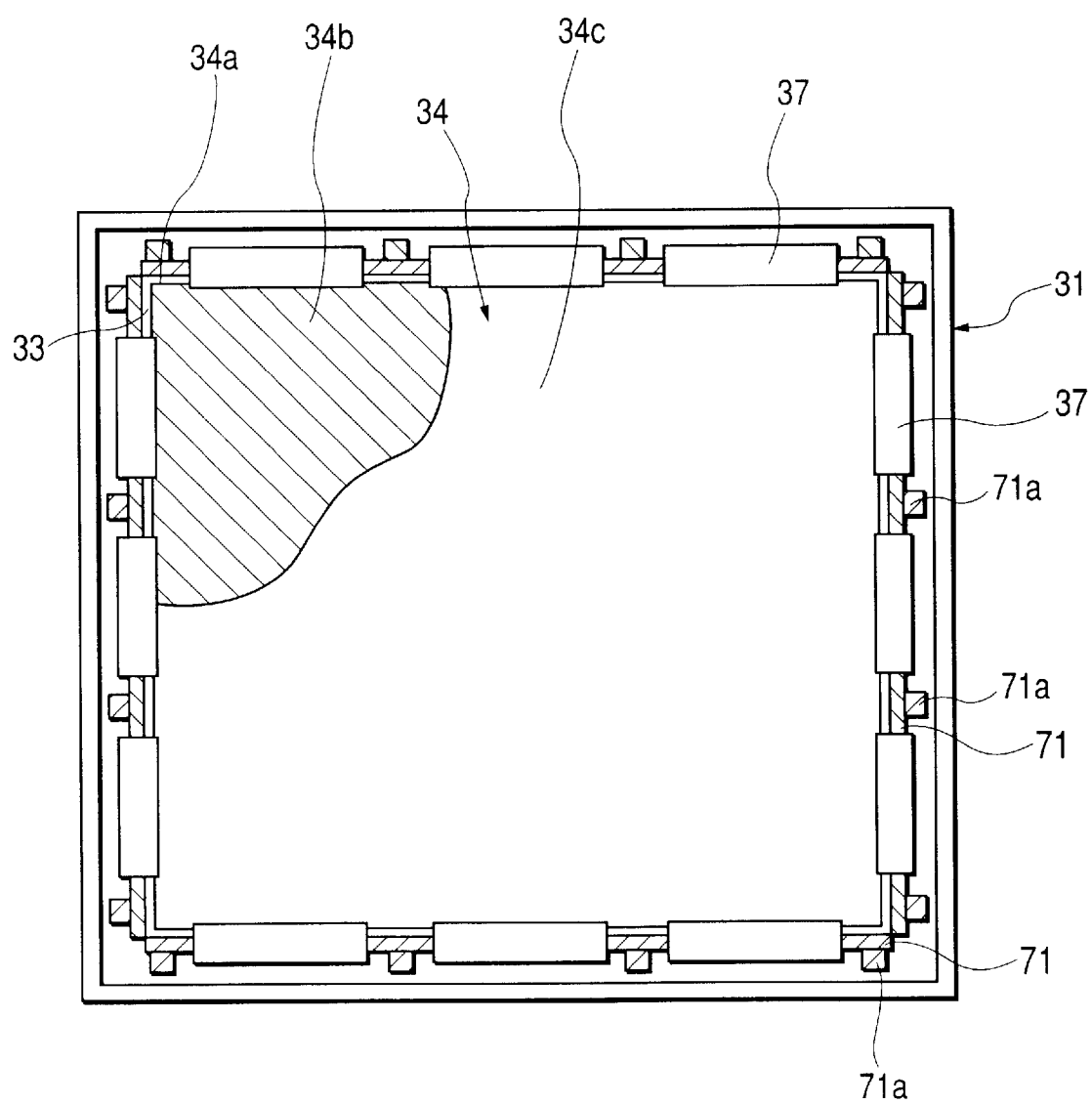
FIG. 9 is a lateral cross-sectional view of a fifth embodiment.

FIG. 9 is a lateral cross-sectional view of an x-ray image radiographic apparatus in accordance with a fifth embodiment. In this embodiment, shock absorbers 71 are fitted to the outer peripheral portion of the support 33, whereas the shock absorbers 61 are fitted to the inner walls of the casing 31 (the inner sides of the side walls) in the fourth embodiment. Therefore, the projections 71a of the shock absorbers 71 are disposed between the respective flexible circuit boards as in the fourth embodiment, thereby to provide functionally the same effects as those in the fourth embodiment.

Figure 10:
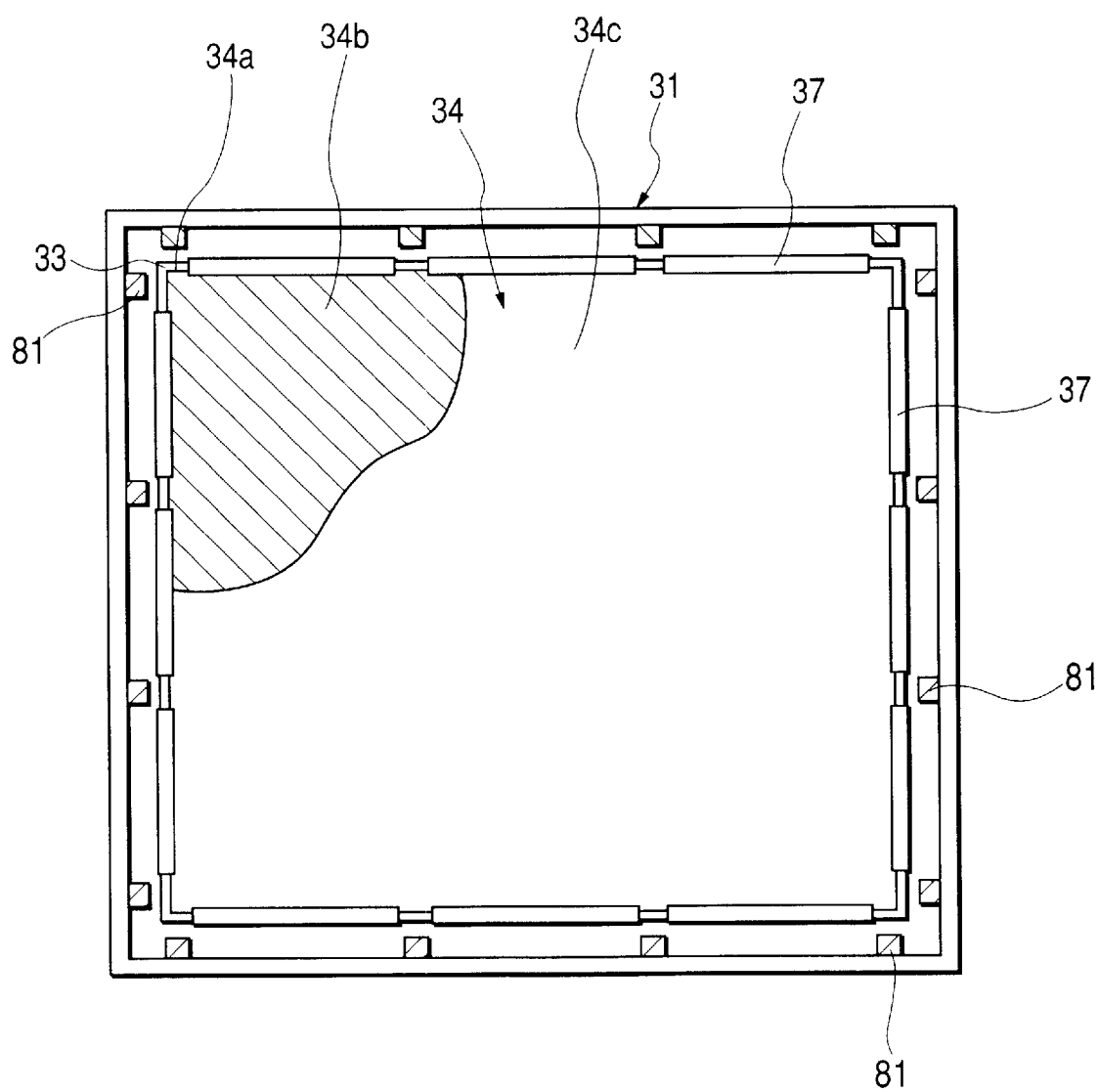
FIG. 10 is a lateral cross-sectional view of a modified example.
Figure 11:
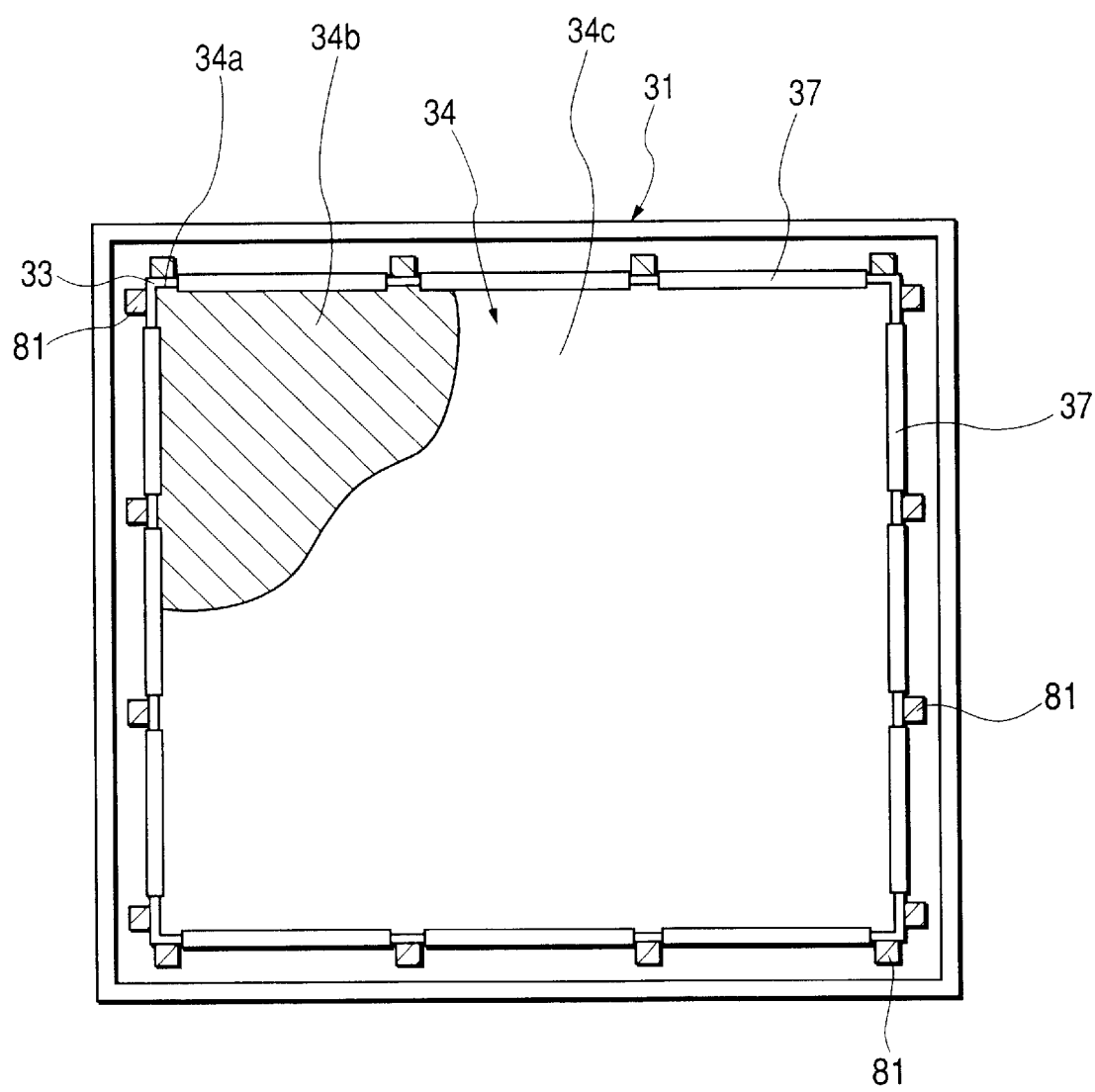
FIG. 11 is a lateral cross-sectional view of another modified example.

Also, in the fourth and fifth embodiments, projections 61a or projections 71a that suppress the deformation of the casing 31 are fitted to the shock absorbers 61 or the shock absorbers 71 as different members, or integrated with the shock absorbers 61 or the shock absorbers 71. Alternatively, as shown in FIGS. 10 and 11, even if projections 81 like projections 61a or 71a are formed on the support 33 or the casing 31 itself, or projections 81 like projections 61a or 71a are fitted to the support 33 or the casing 31, such projections 81 can function as shock absorbers that suppress the deformation of the side walls of the casing 31.

Figure 12:
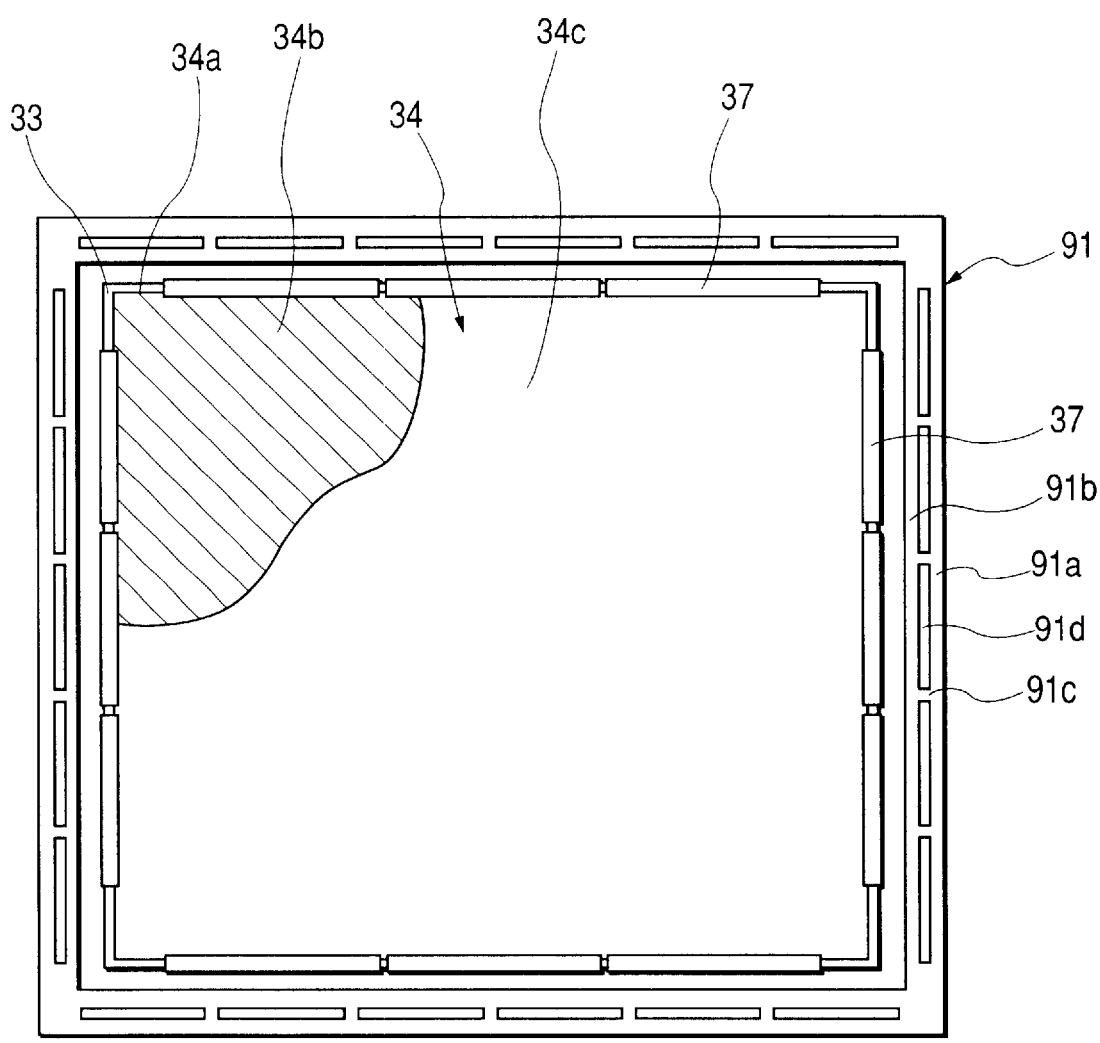
FIG. 12 is a lateral cross-sectional view of a sixth embodiment.

FIG. 12 is a lateral cross-sectional view of an x-ray image taking apparatus in accordance with a sixth embodiment. In the x-ray image taking apparatuses of the first to fifth embodiments, the shock absorbers are disposed between the side walls of the casing 31 and the support 33 as a shock absorber for absorbing shocks from the lateral direction. On the other hand, in this embodiment, the casing 91 itself has a shock-absorbing function.

In other words, in the thickness direction of the side walls the casing 91 is of a double structure made up of an outer wall 91a and an inner wall 91b. The outer wall 91a and the inner wall 91b are partially coupled to each other by a plurality of joint portions 91c, and the outer wall 91a, the inner wall 91b and the joint portions 91c form a plurality of spaces 91d partitioned by the outer wall 91a, the inner wall 91b and the joint portions 91c.

In the x-ray image taking apparatus of the sixth embodiment, in a case where a shock is applied from the lateral direction, the shock is absorbed by the deformation of the wall 91a of the outer side, and the shock transmitted to the wall 91b of the inner side is reduced, and thus the amount of deformation of the inner wall 91b is reduced. Also, the mass corresponding to the volume as much as the spaces 91d can be reduced, and so the x-ray image taking apparatus is lightened in weight.

Figure 13:
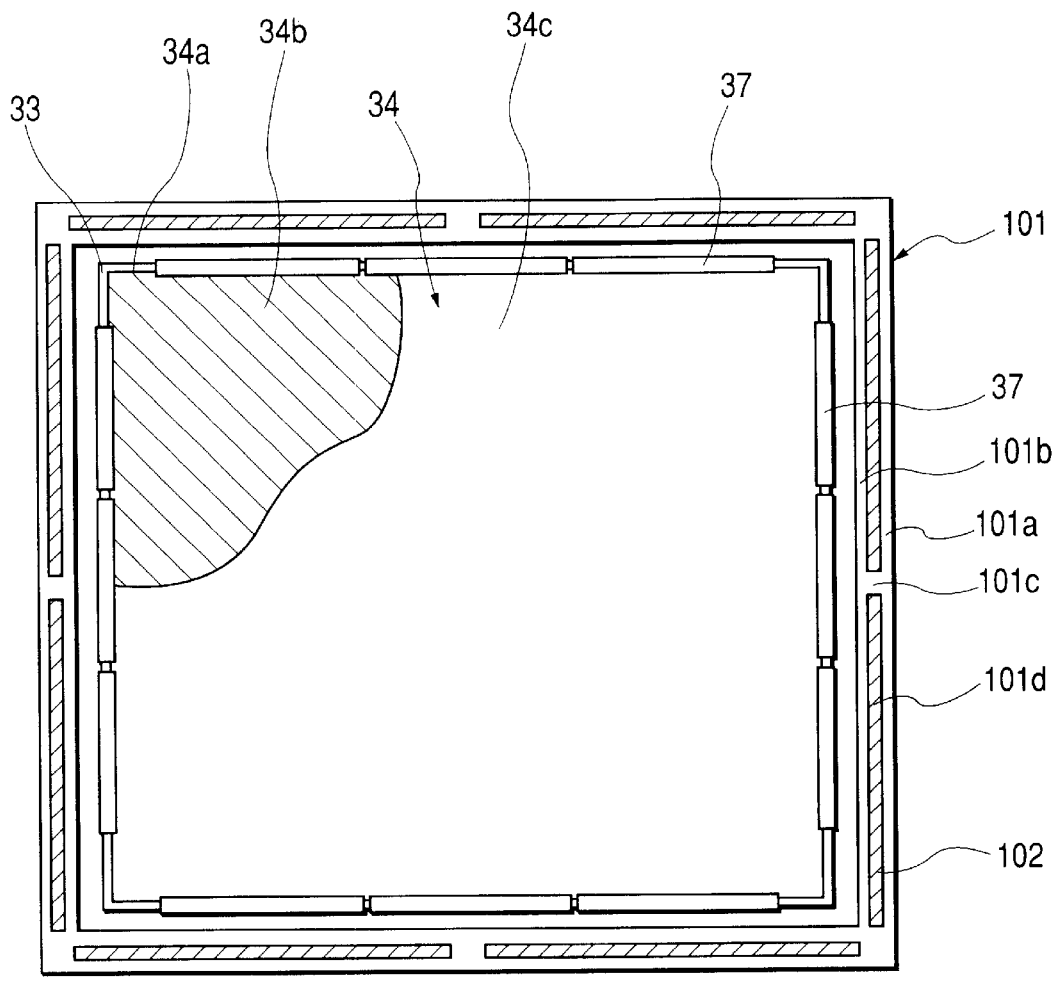
FIG. 13 is a lateral cross-sectional view of a seventh embodiment.

FIG. 13 is a lateral cross-sectional view of an x-ray image radiographic apparatus in accordance with a seventh embodiment. A casing 101 is of a double structure made up of an outer wall 101a and an inner wall 101b, and the outer wall 101a and the inner wall 101b are coupled to each other by a joint portion 110c as in the sixth embodiment. The outer wall 101a, the inner wall 101b and the joint portions 110c form a plurality of spaces 101d partitioned by the outer wall 101a, the inner wall 101b and the joint portions 101c as in the sixth embodiment. However, each of the spaces 101d is filled with a shock absorber 102 made of gel material, rubber (elastic member) or plastic, unlike the sixth embodiment.

In the seventh embodiment, since the shock absorber 102 is inserted into each of the spaces 101d within the casing 101, the shock absorption ability is improved.

Figure 14:
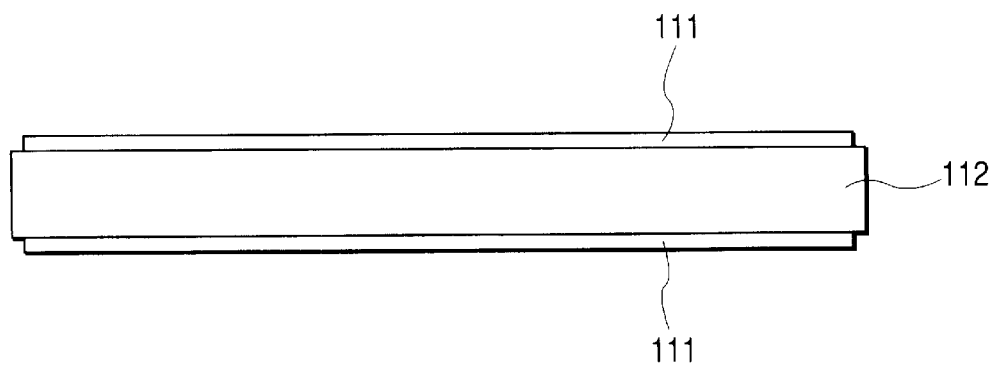
FIG. 14 is a side view of an eighth embodiment.

FIG. 14 is a side view of an x-ray image taking apparatus in accordance with an eighth embodiment, and the structure of the interior of the casing 111 including x-ray image detection panel 34 is identical with that in the above-described embodiments, and hence is omitted from the drawing. In the eighth embodiment, an element having the shock absorbing function is disposed in a region which is not at the inner side of the casing as in the sixth and seventh embodiments. In this embodiment, shock absorbers 112 made of, for example, a sheet-like material having elasticity, such as rubber or a gel material, are fitted to the outer periphery of the side walls of the casing 111 in the shape of a band. Because the shock absorbers 112 absorb shocks from the lateral direction, the deformation of the casing 111 can be suppressed.

Some of the shock absorbing means in the above-described first to eighth embodiments can be appropriately used together.

As was described above, by virtue of the present invention, there can be provided the radiographic apparatus (the digital cassette) that can reduce shocks to the structural elements of the radiographic apparatus in a direction substantially orthogonal to the x-ray incident direction, or in a direction substantially parallel to the detection plane of the x-ray image detection panel, that is, in the lateral direction, and is thin, light in weight and portable. For example, in a case where the radiographic apparatus is dropped on its side wall, because the shock absorbing means or the shock absorbing material for absorbing the shock is disposed on or in the vicinity of the side wall of the casing that supports the detection panel or contains the detection panel therein, the side wall of the casing which has been deformed due to the shock can be well prevented from being brought into contact with the support, the detection panel or the flexible circuit boards, the shock applied to the support, the detection panel or the flexible circuit boards can be sufficiently reduced, the support, the detection panel or the flexible circuit boards can be prevented well from being damaged, or the casing can be prevented well from being deformed beyond its elastic limit. In other words, there can be provided the thin, light-weight and portable radiographic apparatus having an improved shock resistance in the lateral direction.

The foregoing description of the preferred embodiments of the invention has been presented for purposes of illustration and description. It is not intended to be exhaustive or to limit the invention to the precise forms disclosed, and modifications and variations are possible in light of the above teachings or may be acquired from practice of the invention. The described embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A radiographic apparatus for detecting a radiation image which is a distribution of radiation having transmitted through an object, comprising:

a radiation detector having a detection plane detecting the radiation image;

a casing housing the radiation detector;

a support rigidly fixed onto the casing, for supporting the radiation detector on a front surface thereof, the support being housed in the casing; and a shock absorber placed at least any one of on a side wall of the casing, on a side wall of the support, in a side wall of the casing or between the side wall of the casing and the side wall of the support.

2. An apparatus according to claim 1, wherein the radiation detector further comprises:

a radiation image detection panel having the detection plane along which a plurality of photoelectric conversion elements are arranged;

a first electric circuit board placed on a back surface of the support and processing an electric signal from the radiation image detection panel; and a second electric circuit board which is flexible and connects the radiation image detection panel and the first electric circuit board and extends through between the side wall of the casing and the side wall of the support.

3. An apparatus according to claim 2, wherein the second electric circuit board does not make contact with any one of the side wall of the casing, the side wall of the support or the shock absorber when the casing is not given a shock or force.

4. An apparatus according to claim 2, wherein a plurality of such second electric circuit boards are arranged in parallel, and the shock absorber has a plurality of projections provided only at a position corresponding to a position between the plurality of second electric circuit boards.

5. An apparatus according to claim 4, wherein the shock absorber is placed on an inner surface of the side wall of the casing.

6. An apparatus according to claim 4, wherein the shock absorber is placed on the side wall of the support.

7. An apparatus according to claim 4, wherein the shock absorber is made of plastic or elastic material.

8. An apparatus according to claim 4, wherein the projections is placed on an inner surface of the side wall of the casing or on the side wall of the support.

9. An apparatus according to claim 1, wherein the shock absorber is placed on a inner surface of the side wall of the casing.

10. An apparatus according to claim 1, wherein the shock absorber is placed on a outer surface of the side wall of the casing.

11. An apparatus according to claim 1, wherein the shock absorber is made of elastic material or gel.

12. An apparatus according to claim 1, wherein the shock absorber is at least any one of on a inner corner of the casing, on a corner of the support, or between the corner of the casing and the corner of the support.

13. An apparatus according to claim 12, wherein the shock absorber is made of plastic or elastic material.

14. An apparatus according to claim 12, wherein the shock absorber is substantially L-shaped.

15. An apparatus according to claim 1, wherein the shock absorber comprises a side wall having an space or a gap inside thereof of the casing.

16. An apparatus according to claim 15, wherein the space or the gap is filled with a second shock absorber.

17. An apparatus according to claim 16, wherein the second shock absorber comprises at least any one of elastic material, gel or plastic.

18. A radiographic apparatus for detecting a radiation image which is a distribution of radiation having transmitted through an object, comprising:

a radiation detector having a detection plane, for detecting the radiation image;

a casing housing the radiation detector;

a support rigidly fixed onto the casing, for supporting the radiation detector on a front surface thereof, the support being housed in the casing; and a shock absorber arranged to absorb a shock given from outside of the casing in a direction substantially parallel to the detection plane.

* * * * *

UNITED STATES PATENT AND TRADEMARK OFFICE
CERTIFICATE OF CORRECTION

PATENT NO. : 6,700,126 B2
DATED : March 2, 2004
INVENTOR(S) : Tetsuo Watanabe

It is certified that error appears in the above-identified patent and that said Letters Patent is hereby corrected as shown below:

Column 1,
Line 6, "an" should read -- a --.

Column 2,
Line 10, "faseter" should read -- faster --.
Line 46, "is" (second occurrence) should read -- be --;
Line 49, "that contains" should read -- contain --; and
Line 54, "three" should read -- there --.

Column 4,
Line 13, "is so formed" should read -- are formed so --.

Column 9,
Line 14, "is" should read -- are --; and
Lines 17, 20 and 25, "a" should read -- an --.

Column 10,
Line 6, "an" should read -- a --.

Signed and Sealed this

Twenty-seventh Day of September, 2005

JON W. DUDAS
*Director of the United States Patent and Trademark Office*